(12) United States Patent
Rouleau et al.

(10) Patent No.: US 11,136,059 B1
(45) Date of Patent: Oct. 5, 2021

(54) CONTACTLESS ABSOLUTE RAKE POSITION SENSOR FOR POWER ADJUSTABLE COLUMNS

(71) Applicant: Steering Solutions IP Holding Corporation, Saginaw, MI (US)

(72) Inventors: James E. Rouleau, Burt, MI (US); Edward A. Cana, Grand Blanc, MI (US); Damian Z. Gosztyla, Bay City, MI (US); Robert D. Bueche, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/841,033

(22) Filed: Apr. 6, 2020

(51) Int. Cl.
*B62D 1/181* (2006.01)
*B62D 1/187* (2006.01)

(52) U.S. Cl.
CPC ............ *B62D 1/187* (2013.01); *B62D 1/181* (2013.01)

(58) Field of Classification Search
CPC .......... B62D 1/181; B62D 1/183; B62D 1/18; B62D 1/187; B62D 1/189; G01D 5/142; G01D 5/145; G01B 7/14
USPC ............... 324/207.2, 207.21, 207.25, 207.26
See application file for complete search history.

(56) References Cited

U.S. PATENT DOCUMENTS

| 5,955,881 | A * | 9/1999 | White | G01B 7/30 324/207.2 |
| 9,630,644 | B2 * | 4/2017 | Soderlind | B62D 1/181 |
| 10,974,756 | B2 * | 4/2021 | Cana | B62D 1/184 |
| 2004/0017190 | A1 * | 1/2004 | McDearmon | G01D 5/145 324/207.25 |
| 2018/0086378 | A1 * | 3/2018 | Bell | B62D 1/185 |
| 2018/0148084 | A1 * | 5/2018 | Nash | B62D 1/183 |
| 2020/0324814 | A1 * | 10/2020 | Riley | B62D 1/184 |
| 2020/0339176 | A1 * | 10/2020 | Cao | B62D 1/187 |

FOREIGN PATENT DOCUMENTS

| DE | 102004044472 A1 * | 3/2006 | ............ B62D 1/181 |
| DE | 102004059879 B3 * | 9/2006 | ............ B62D 1/181 |

* cited by examiner

*Primary Examiner* — Ruth Ilan
(74) *Attorney, Agent, or Firm* — Dickinson Wright PLLC

(57) ABSTRACT

Embodiments described herein are for a position sensor system integrated into a steering column assembly of a vehicle. The position sensor includes an elongated target comprising a sloping top surface, a first arcuate lateral surface, a second arcuate lateral surface, and an attachment feature for connecting the elongated target to a moveable part of the steering column assembly. The position sensor also includes a sensor device comprising an attachment feature for connecting the sensor device to a stationary part of the steering column assembly and a sensor situated over the sloping top surface of the elongated target. The sensor is configured to detect a position of the elongated target relative to the sensor, where the position of the elongated target corresponds to a position of a steering column of the steering column assembly.

20 Claims, 4 Drawing Sheets

CONTACTLESS ABSOLUTE RAKE POSITION SENSOR FOR POWER ADJUSTABLE COLUMNS

TECHNICAL FIELD

This disclosure relates to vehicles and in particular to systems for monitoring positioning of power adjustable columns.

BACKGROUND

Conventionally power column memory controllers use a relative position system to track the positions of the steering column axis. This type of system requires that the memory controller accumulates information and computes the current position based on previous positions of the steering column. Errors that occur in this type of system involve issues in accumulating change in position of the steering column and detecting incorrect previous positions of the steering column.

Issues in accumulating change in position occur when the controller does not recognize motion has occurred and the motion information thereby is not captured. This may be a result of a faulty monitoring algorithm. For example, a controller monitoring an actuator that enables the movement of a steering column may stop monitoring the actuator before movement of the steering column is complete or poor signal quality may cause integral information related to the movement of the steering column not to be recognized. More specifically, over accumulation may occur if noise on the signal is misinterpreted as relevant information. Errors associated with the accumulation of information can be compounding and even small errors can add up to become significant errors with time. These errors will eventually cause issues in detecting the correct positioning of the steering column.

The detection of an incorrect starting location is usually associated with a loss of information. The current position of the actuator can be lost if not saved to non-volatile memory within a certain period. In some instances, the current position of the actuator may not be saved before a steering column system is reset. As such, the current position recalled after the system is reset will not be the actual current position of the steering column, but the previously saved position information.

SUMMARY

This disclosure relates generally to systems for detecting a position of a steering column of a steering column assembly of a vehicle. An aspect of the disclosed embodiments includes an absolute position sensor system integrated into a steering column assembly of a vehicle. The absolute position sensor system includes an elongated target. The elongated target comprises: a sloping top surface; a bottom surface opposite to the top surface; a first arcuate lateral surface situated between and adjoining a portion of the top surface and a portion of the bottom surface; a second arcuate lateral surface situated between and adjoining another portion of the top surface and another portion of the bottom surface, where the second arcuate lateral surface opposite to the first arcuate lateral surface; and an attachment feature for connecting the elongated target to a moveable part of the steering column assembly. The absolute position sensor system also includes a sensor device comprising an attachment feature for connecting the sensor device to a stationary part of the steering column assembly and a sensor situated over the sloping top surface of the elongated target. The sensor is configured to: detect a position of the elongated target relative to the sensor, the position of the elongated target corresponding to a position of a steering column of the steering column assembly; and generate, for a controller configured to monitor positioning of the steering column, a signal that indicates the position of the steering column.

Another aspect of the disclosed embodiments includes a steering column assembly of a vehicle. The steering column assembly comprises: a steering column; a mounting bracket operable to attach the steering column assembly to the vehicle; a rake adjustment mechanism operable to move in an arcuate motion to adjust the steering column in a rake direction; and an absolute position sensor system. The absolute position sensor system comprises: an elongated target comprising a sloping top surface; a bottom surface opposite to the top surface; a first arcuate lateral surface situated between and adjoining a portion of the top surface and a portion of the bottom surface; a second arcuate lateral surface situated between and adjoining another portion of the top surface and another portion of the bottom surface, where the second arcuate lateral surface opposite to the first arcuate lateral surface; and an attachment feature for connecting the elongated target to the rake adjustment mechanism. The absolute position sensor system also includes a sensor device comprising an attachment feature for connecting the sensor device to the mounting bracket and a sensor situated over the sloping top surface of the elongated target, the sensor configured to: detect a position of the elongated target relative to the sensor, the position of the elongated target corresponding to a position of the steering column of the steering column assembly; and generate a signal that indicates the position of the steering column.

Another aspect of the disclosed embodiments includes a steering column assembly of a vehicle. The steering column assembly comprises: a steering column; a mounting bracket operable to attach the steering column assembly to the vehicle; a rake adjustment mechanism operable to move in an arcuate motion to adjust the steering column in a rake direction; and an absolute position sensor system. The absolute position sensor system comprises: an elongated target comprising a sloping top surface; a bottom surface opposite to the top surface; a first arcuate lateral surface situated between and adjoining a portion of the top surface and a portion of the bottom surface; a second arcuate lateral surface situated between and adjoining another portion of the top surface and another portion of the bottom surface, where the second arcuate lateral surface opposite to the first arcuate lateral surface; and an attachment feature for connecting the elongated target to the rake adjustment mechanism. The absolute position sensor system also includes a sensor device comprising an attachment feature for connecting the sensor device to the mounting bracket and a sensor situated over the sloping top surface of the elongated target, the sensor configured to: detect a position of the elongated target relative to the sensor, the position of the elongated target corresponding to a position of the steering column of the steering column assembly; and generate a signal that indicates the position of the steering column. The steering column assembly further includes a controller configured to: receive the signal that indicates the position of the steering column; generate a steering column position control value based on the signal; and selectively control position of the steering wheel of the vehicle based on the steering column position control value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Systems described herein may be configured to address the problems described above by generating, for a controller tasked to monitor the position of a steering column, a plurality of signals, where each signal of the plurality of signals corresponds to a unique position of the steering column. As such, in accordance with embodiments described herein, the controller will be able to receive and interpret a signal and without performing further calculations or accessing memory to determine positioning of the steering column. While conventional steering column assemblies may implement a relative position system that generate signals including incremental movement information of a steering column, the embodiments described herein implement an absolute position sensor system that is configured to generate signals that are indicative of particular positioning of the steering column.

For example, an aspect of the disclosed embodiments includes an absolute position sensor system integrated into a steering column assembly of a vehicle. The absolute position sensor system includes an elongated target. The elongated target comprises: a sloping top surface; a bottom surface opposite to the top surface; a first arcuate lateral surface situated between and adjoining a portion of the top surface and a portion of the bottom surface; a second arcuate lateral surface situated between and adjoining another portion of the top surface and another portion of the bottom surface, where the second arcuate lateral surface opposite to the first arcuate lateral surface; and an attachment feature for connecting the elongated target to a moveable part of the steering column assembly. The absolute position sensor system also includes a sensor device comprising an attachment feature for connecting the sensor device to a stationary part of the steering column assembly and a sensor situated over the sloping top surface of the elongated target. The sensor is configured to: detect a position of the elongated target relative to the sensor, the position of the elongated target corresponding to a position of a steering column of the steering column assembly; and generate, for a controller configured to monitor positioning of the steering column, a signal that indicates the position of the steering column.

Figure 1:
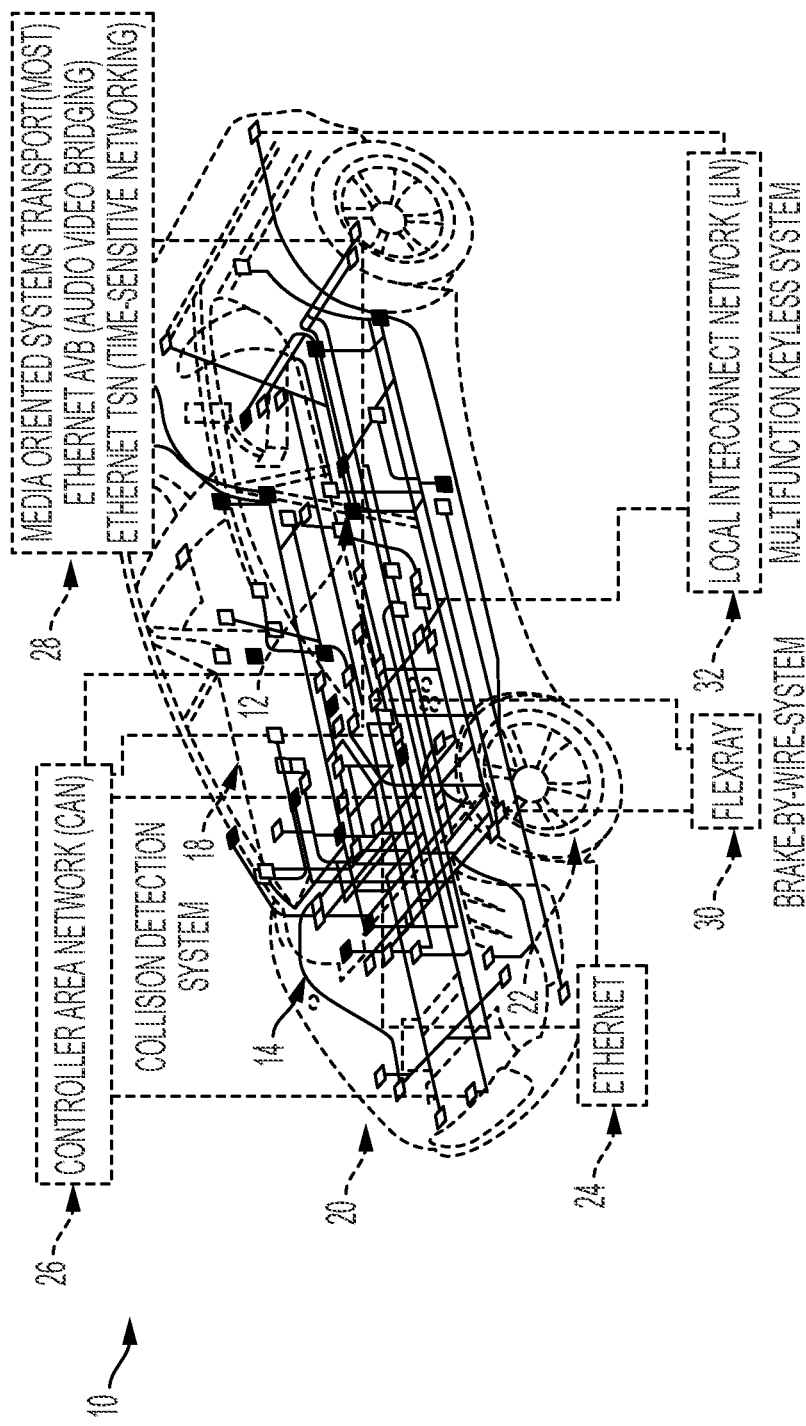
FIG. 1 generally illustrates a vehicle according to the principles of the present disclosure.

To explore the foregoing in further detail, FIG. 1 will now be described. FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. In some embodiments, the vehicle 10 is configured for domain control with over-the-air programming support. For example, as described, the vehicle 10 may receive updates for any suitable software component of the vehicle 10, via the Internet (e.g., or other suitable network). The vehicle 10 may update or change software components based on the update. The vehicle 10 may include additional or fewer features than those generally illustrated and/or disclosed herein.

Figure 2:
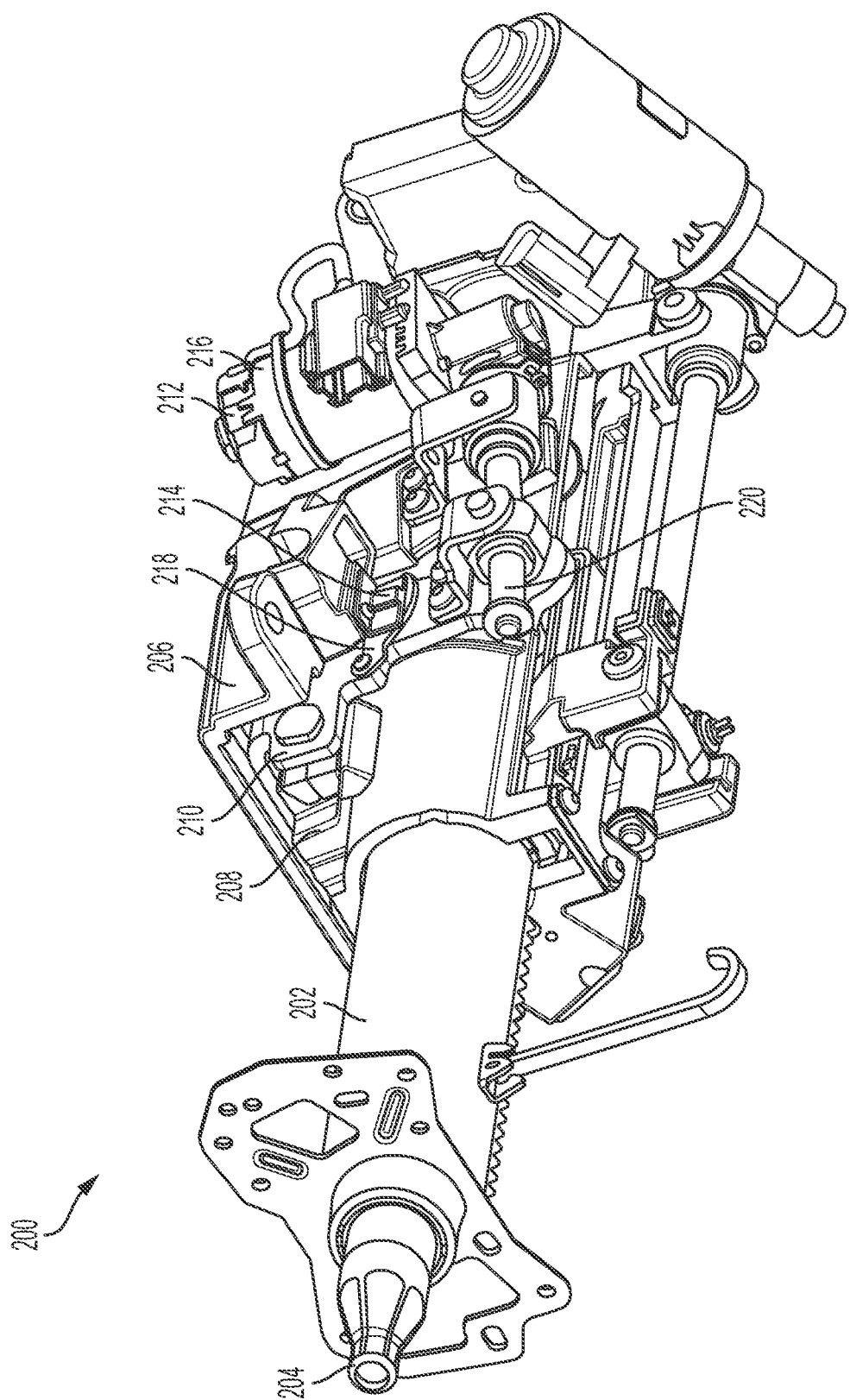
FIG. 2 generally illustrates a steering column assembly of a vehicle according to the principles of the present disclosure.

In some embodiments, the vehicle 10 may further include a steering column assembly. A steering column system 200 according to the principles of the present disclosure is generally shown in FIG. 2. Vehicle 10 may include the steering column system 200 and an operator of vehicle 10 may adjust a steering wheel (not shown) of the steering column assembly 200 for a rake (i.e., up and down) and for reach (i.e., telescoping movement in and out). The steering column system 200 includes a upper jacket 202 which carries an inner rotating shaft 204 for transmitting movements from the steering wheel to front wheels of vehicle 10. In FIG. 2, the inner shaft 204 may be coupled to an electronic control mechanism or assist. Alternatively, the inner shaft 204 can extend to a hydraulic or mechanical steering mechanism.

For purposes of supporting the steering column system 200 within the vehicle 10, the steering column system 200 includes a mounting bracket 206 configured to facilitate a fixed, or stationary, attachment of the steering column system 200 relative to the vehicle 10. The steering column system 200 further includes a lower jacket 208 that defines an internal cavity having an open end. As shown in FIG. 2, the internal cavity of the lower jacket 208 is sized to accommodate the upper jacket 202 and the upper jacket 202 is positioned within the internal cavity of the lower jacket 208 such that a portion of the upper jacket 202 is extending outside of the lower jacket 208. The lower jacket 208 is connected to and partially positioned within mounting bracket 206 in such a manner that the upper jacket 202 is permitted to travel in arcuate (rake) and axial (telescope) motions relative to the vehicle.

To achieve an arcuate motion, as shown in FIG. 2, the steering column system 200 includes a motor 216 and gearing (not shown) for transferring the rotary motion of the motor 216 to move a shaft 220. The shaft 220 is connected to an arm 210 and operable to move the arm 210 in the rake direction. The arm 210 is connected to the lower jacket 208 and operable to move the lower jacket 208 and the upper jacket 202 in the rake direction.

As further shown in FIG. 2, the steering column assembly 200 includes a sensor device 214 mechanically coupled to the mounting bracket 206 and a target 218 mechanically coupled to the arm 210. In some embodiments, the sensor device 214 and the mounting bracket 206 and the target 218 and the arm 210 may be affixed to each other using fasteners (e.g., bolts, screws, etc.) or via another attachment structure.

The sensor device 214 is configured to detect a position of the target 218 and send a signal that is indicative of the position of the target 218 to controller 212. The sensor 214 may be an absolute position sensor, such as a Hall-effect sensor. For example, in some embodiments, the sensor device 214 may be a programmable linear Hall-effect sensor integrated circuit (IC). Further, the sensor device 214 may include a permanent magnet, one or more Hall-effect sensing elements, and signal processing circuitry. For example, a permanent magnet may be integrated into the sensor device 214 to provide a magnetic field of constant intensity through the sensor device 214, and the sensor device 214 may also include two Hall-effect sensing elements. The magnetic field provided by the permanent magnet may be oriented to pass through the two Hall-effect sensing elements. A common-mode magnetic flux through the two Hall-effect sensing elements may produce two Hall outputs and the signal processing circuitry of the sensor device 214 may subtract, amplify, and process (digitally) the two Hall outputs element to generate a single output proportional to the differential magnetic signal. The differential magnetic signal provides a robustness to extraneous magnetic interference from other sources. In some embodiments, the Hall-effect sensing elements may be temperature compensated (e.g., providing up to ten bits of resolution).

In some embodiments, the target 218 may be a ferrous feature made of mild steel and configured to move relative to the sensor device 214 along the x-axis. As the target 218 moves, the distance from the target 218 to the sensor device 214 changes causing the reluctance of the magnetic circuit to change with position. The change in reluctance causes the flux through the hall sensors to vary and hence the position is able to be sensed.

The controller 212 may include any suitable controller, such as a vehicle electronic control unit, a processor, or any other suitable controller, such as those described herein. The controller 212 is configured to receive the signal sent by the sensor device 214, to interpret the signal, generate a steering column position control value based on the signal, and selectively control position of the steering wheel of the vehicle based on the steering column position control value. For example, the controller 212 may be configured to monitor the position of a steering column assembly 200 to prevent movement of a steering wheel of the steering column assembly 200 from violating any boundaries or creating any clearance concerns. In the event that the steering column assembly 200 is commanded to move into a position that would create a clearance concern, the controller 212 can force movement of the steering column assembly 200 with the steering column position control value to avoid the clearance concern.

Figure 3:
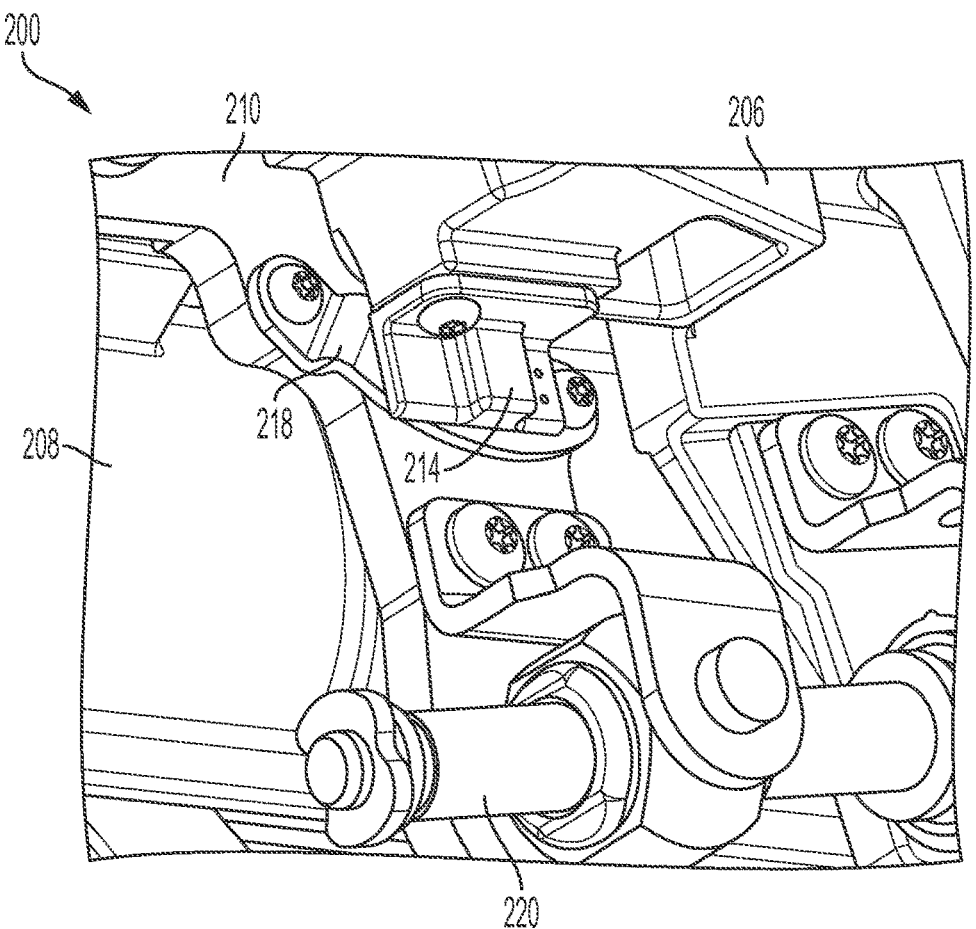
FIG. 3 generally illustrates a steering column assembly of a vehicle according to the principles of the present disclosure.

FIG. 3 provides an enlarged perspective view of FIG. 2 of the sensor device 214 and the target 218 integrated into the steering column assembly 200. As seen in FIG. 3, the target 218 assumes an elongated structure. In some embodiments, the target 218 is substantially planar (i.e., a structure that is substantially longer and wider than thick) and includes a sloping top surface. The sloping top surface of the target 218 is designed to have a height that varies as the arm 210 rotates past the sensor device 214.

Figure 4:
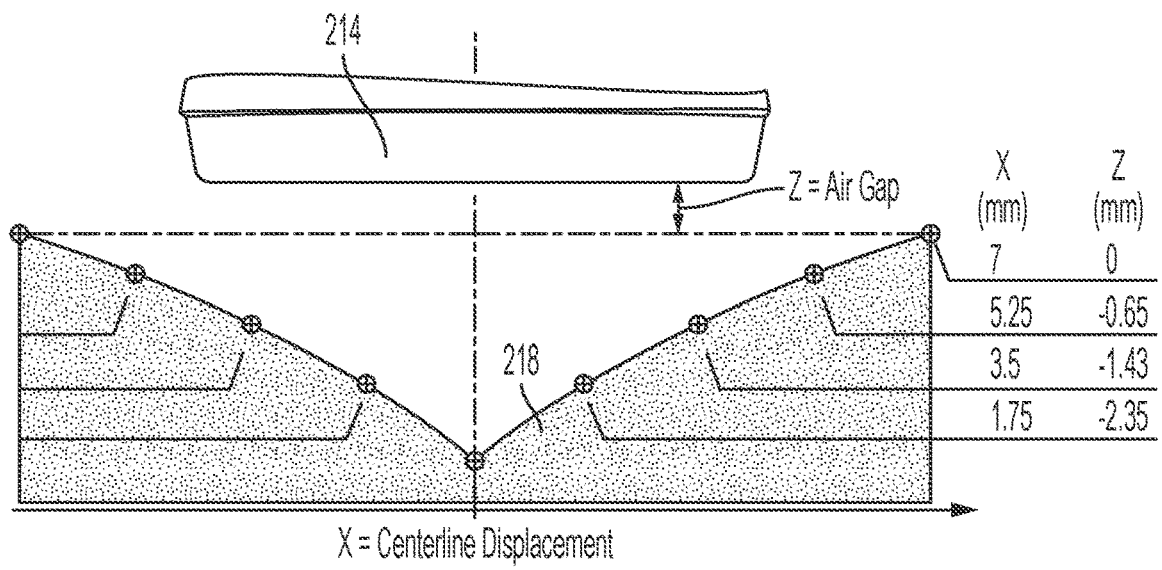
FIG. 4 generally illustrates a sensor device suspended over a target according to the principles of the present disclosure.

FIG. 4 provides a view of the sensor device 214 suspended over the target 218. As shown in FIG. 4, a gap is maintained between a highest point on the top surface of the target 218 and the sensor device 214 such that the target 218 and the sensor device 214 do not touch. As the target 218 moves under the sensor device 214, the sensor device 214 is configured to detect a position of the target 218 relative to the sensor device 214. The position of the target 218 corresponds to a position of a steering column of the steering column assembly 200. The sensor device 214 is further configured to generate for controller 212, which is configured to monitor positioning of a steering column of the steering column assembly 200, a signal that indicates the position of the steering column. As further shown in FIG. 4, the target 218 may be symmetrical. This doubles the resolution of the absolute position sensor system. For example, in some embodiments, due to the hall sensors using a differential basis, signal to sensor "A" that is less than signal to sensor "B" is not the same as signal to sensor "A" that is greater than signal to sensor "B". The differential element takes the difference of the signals and therefore can use the "negative side of the curve".

Figure 5:
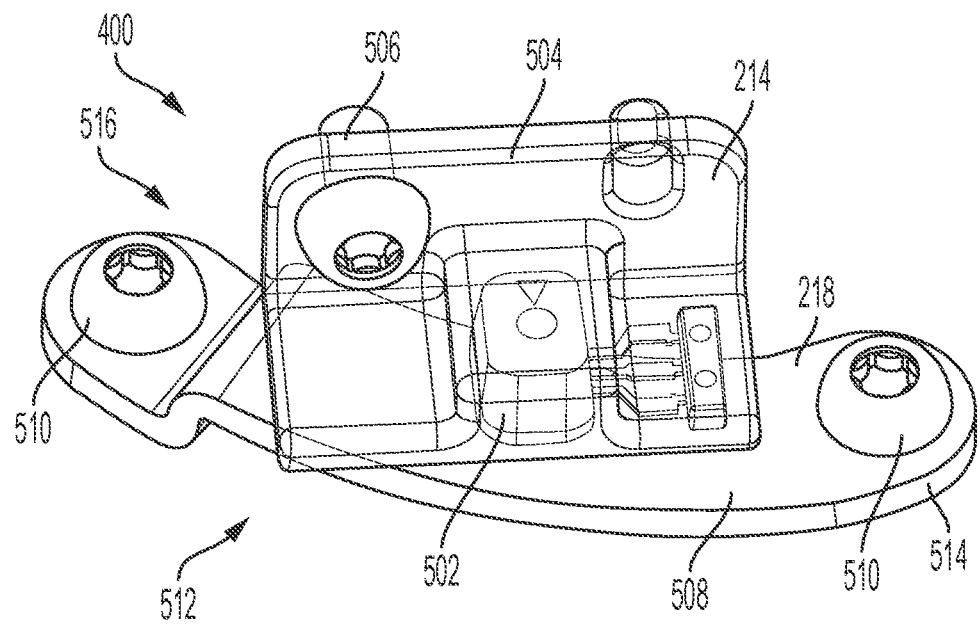
FIGS. 5-6 provides a perspective view of a sensor device and a target according to the principles of the present disclosure.

FIG. 5 provides another enlarged perspective view of the target 218 and the sensor device 214. In FIG. 5, the sensor device 214 includes a sensor 502. The sensor device 214 further includes a housing 504 that attaches to a stationary part of the steering column assembly 200 by the attachment feature 506 of the sensor device 214. The housing 504 defines a cavity sized to accommodate the sensor 502 and arranged such that the sensor 502 is suspended over the sloping top surface 508 of the target 218.

As shown in FIG. 5, the target 218 is position below the sensor device 214. In FIG. 5, the target 218 comprises a sloping top surface 508, a bottom surface opposite to the top surface 512, a first arcuate lateral surface 514 situated between and adjoining a portion of the top surface 508 and a portion of the bottom surface 512, a second arcuate lateral surface 516 situated between and adjoining another portion of the top surface 508 and another portion of the bottom surface 512. The second arcuate lateral surface 516 is opposite to the first arcuate lateral surface 514. The second arcuate lateral surface 516 is parallel to the first arcuate lateral surface 514. The target 218 further includes an attachment feature 510 for connecting the elongated target to a moveable part of the steering column assembly 200. The attachment feature 510 includes a first fastener located at an end of the target 218 and a second fastener located at an opposite end of the target 218.

Figure 6:
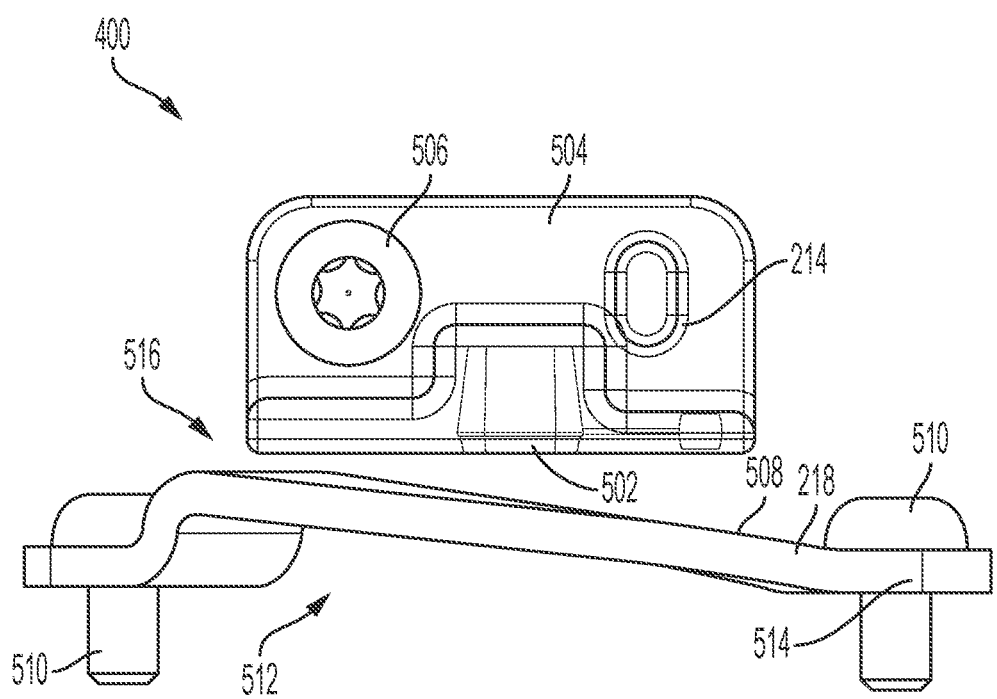

FIG. 6 provides another perspective view of the target 218 and sensor device 214. FIG. 6 includes a profile view of the sensor device 214 and target 218. As shown in FIG. 6, the bottom surface 512 of the target 218 is substantially level at the end of the target 218 and the opposite end of the target 218 where the attachment features 510 are located.

Some advantages of the embodiments described herein include the following: non-contact sensor implementation prevents wear and friction from relative motion of target and Hall-effect sensor IC; absolute position sensing of rake position prevents errors associated with relative position systems; dual hall elements provide immunity to extraneous signals via differential linear signal processing and Hall-effect sensor IC is programmable for range, offset, temperature compensation to provide robust signal. Moreover, as described above, relative motion between the target and the sensor can be accomplished with a moving target and stationary sensor. Relative motion between the target and sensor may also be accomplished with a stationary target and a moving sensor.

In some embodiments, an absolute position sensor system integrated into a steering column assembly of a vehicle, comprises: an elongated target comprising a sloping top surface, a bottom surface opposite to the top surface, a first arcuate lateral surface situated between and adjoining a portion of the top surface and a portion of the bottom surface, a second arcuate lateral surface situated between and adjoining another portion of the top surface and another portion of the bottom surface, the second arcuate lateral surface opposite to the first arcuate lateral surface, and an attachment feature for connecting the elongated target to a moveable part of the steering column assembly; and a sensor device comprising an attachment feature for connecting the sensor device to a stationary part of the steering column assembly and a sensor situated over the sloping top surface of the elongated target, the sensor configured to: detect a position of the elongated target relative to the sensor, the position of the elongated target corresponding to a position of a steering column of the steering column assembly; and generate, for a controller configured to monitor positioning of the steering column, a signal that indicates the position of the steering column.

In some embodiments of the absolute position sensor system, the moveable part of the steering column assembly is operable to move in an arcuate motion for rake adjustment of the steering column.

In some embodiments of the absolute position sensor system, the stationary part of the steering column assembly is operable to mount the steering column assembly to the vehicle.

In some embodiments of the absolute position sensor system, the sensor includes a Hall-effect integrated circuit.

In some embodiments of the absolute position sensor system, the sensor includes dual Hall-effect elements.

In some embodiments of the absolute position sensor system, the attachment feature includes a first fastener located at an end of the elongated target and a second fastener located at an opposite end of the elongated target; and the bottom surface is substantially level at the end of the elongated target and the opposite end of the elongated target.

In some embodiments of the absolute position sensor system, the sensor device further includes a housing attached to the stationary part of the steering column assembly by the attachment feature of the sensor device, the housing defining a cavity, the cavity being sized to accommodate the sensor and arranged such that the sensor is suspended over the sloping top surface of the elongated target.

In some embodiments of the absolute position sensor system, the second arcuate lateral surface is parallel to the first arcuate lateral surface.

In some embodiments, a steering column assembly of a vehicle, comprising: a steering column; a mounting bracket operable to attach the steering column assembly to the vehicle; a rake adjustment mechanism operable to move in an arcuate motion to adjust the steering column in a rake direction; and an absolute position sensor system comprising: an elongated target comprising a sloping top surface, a bottom surface opposite to the top surface, a first arcuate lateral surface situated between and adjoining a portion of the top surface and a portion of the bottom surface, a second arcuate lateral surface situated between and adjoining another portion of the top surface and another portion of the bottom surface, the second arcuate lateral surface opposite to the first arcuate lateral surface, and an attachment feature for connecting the elongated target to the rake adjustment mechanism; and a sensor device comprising an attachment feature for connecting the sensor device to the mounting bracket and a sensor situated over the sloping top surface of the elongated target, the sensor configured to: detect a position of the elongated target relative to the sensor, the position of the elongated target corresponding to a position of the steering column of the steering column assembly; and generate a signal that indicates the position of the steering column.

In some embodiments of the steering column assembly, a controller is configured to: receive the signal that indicates the position of the steering column; generate a steering column position control value based on the signal; and selectively control position of the steering wheel of the vehicle based on the steering column position control value.

In some embodiments of the steering column assembly, the sensor includes a Hall-effect integrated circuit.

In some embodiments of the steering column assembly, the sensor includes dual Hall-effect elements.

In some embodiments of the steering column assembly, the attachment feature includes a first fastener located at an end of the elongated target and a second fastener located at an opposite end of the elongated target; and the bottom surface is substantially level at the end of the elongated target and the opposite end of the elongated target.

In some embodiments of the steering column assembly, the sensor device further includes a housing attached to the mounting bracket by the attachment feature of the sensor device, the housing defining a cavity, the cavity being sized to accommodate the sensor and arranged such that the sensor is suspended over the sloping top surface of the elongated target.

In some embodiments of the steering column assembly, the second arcuate lateral surface is parallel to the first arcuate lateral surface.

In some embodiments, a steering column assembly of a vehicle, comprises: a steering column; a mounting bracket operable to attach the steering column assembly to the vehicle; a rake adjustment mechanism operable to move in an arcuate motion to adjust the steering column in a rake direction; an absolute position sensor system comprising: an elongated target comprising a sloping top surface, a bottom surface opposite to the top surface, a first arcuate lateral surface situated between and adjoining a portion of the top surface and a portion of the bottom surface, a second arcuate lateral surface situated between and adjoining another portion of the top surface and another portion of the bottom surface, the second arcuate lateral surface opposite to the first arcuate lateral surface, and an attachment feature for connecting the elongated target to the rake adjustment mechanism; and a sensor device comprising an attachment feature for connecting the sensor device to the mounting bracket and a sensor situated over the sloping top surface of the elongated target, the sensor configured to: detect a position of the elongated target relative to the sensor, the position of the elongated target corresponding to a position of the steering column of the steering column assembly; and generate a signal that indicates the position of the steering column; and a controller configured to: receive the signal that indicates the position of the steering column; generate a steering column position control value based on the signal; and selectively control position of the steering wheel of the vehicle based on the steering column position control value.

In some embodiments of the steering column assembly, the sensor includes a Hall-effect integrated circuit.

In some embodiments of the steering column assembly, the sensor includes dual Hall-effect elements.

In some embodiments of the steering column assembly, the attachment feature includes a first fastener located at an end of the elongated target and a second fastener located at an opposite end of the elongated target; and the bottom surface is substantially level at the end of the elongated target and the opposite end of the elongated target.

In some embodiments of the steering column assembly, the sensor device further includes a housing attached to the mounting bracket by the attachment feature of the sensor device, the housing defining a cavity, the cavity being sized to accommodate the sensor and arranged such that the sensor is suspended over the sloping top surface of the elongated target.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term system can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a system can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a system can include memory that stores instructions executable by a controller to implement a feature of the system.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. An absolute position sensor system integrated into a steering column assembly of a vehicle, comprising:
    an elongated target comprising:
        a sloping top surface;
        a bottom surface opposite to the top surface;
        a first arcuate lateral surface situated between and adjoining a portion of the top surface and a portion of the bottom surface;
        a second arcuate lateral surface situated between and adjoining another portion of the top surface and another portion of the bottom surface, the second arcuate lateral surface opposite to the first arcuate lateral surface; and
        an attachment feature for connecting the elongated target to a moveable part of the steering column assembly; and
    a sensor device comprising:
        an attachment feature for connecting the sensor device to a stationary part of the steering column assembly; and
        a sensor situated over the sloping top surface of the elongated target, the sensor configured to:
            detect a position of the elongated target relative to the sensor, the position of the elongated target corresponding to a position of a steering column of the steering column assembly; and
            generate, for a controller configured to monitor positioning of the steering column, a signal that indicates the position of the steering column.

2. The absolute position sensor system of claim 1, wherein the moveable part of the steering column assembly is operable to move in an arcuate motion for rake adjustment of the steering column.

3. The absolute position sensor system of claim 1, wherein the stationary part of the steering column assembly is operable to mount the steering column assembly to the vehicle.

4. The absolute position sensor system of claim 1, wherein the sensor includes a Hall-effect integrated circuit.

5. The absolute position sensor system of claim 4, wherein the sensor includes dual Hall-effect elements.

6. The absolute position sensor system of claim 1, wherein:
    the attachment feature includes a first fastener located at an end of the elongated target and a second fastener located at an opposite end of the elongated target; and
    the bottom surface is substantially level at the end of the elongated target and the opposite end of the elongated target.

7. The absolute position sensor system of claim 1, wherein the sensor device further includes a housing attached to the stationary part of the steering column assembly by the attachment feature of the sensor device, the housing defining a cavity, the cavity being sized to accommodate the sensor and arranged such that the sensor is suspended over the sloping top surface of the elongated target.

8. The absolute position sensor system of claim 1, wherein the second arcuate lateral surface is parallel to the first arcuate lateral surface.

9. A steering column assembly of a vehicle, comprising:
    a steering column;
    a mounting bracket operable to attach the steering column assembly to the vehicle;
    a rake adjustment mechanism operable to move in an arcuate motion to adjust the steering column in a rake direction; and
    an absolute position sensor system comprising:
        an elongated target comprising a sloping top surface, a bottom surface opposite to the top surface, a first arcuate lateral surface situated between and adjoining a portion of the top surface and a portion of the bottom surface, a second arcuate lateral surface situated between and adjoining another portion of the top surface and another portion of the bottom surface, the second arcuate lateral surface opposite to the first arcuate lateral surface, and an attachment feature for connecting the elongated target to the rake adjustment mechanism; and
        a sensor device comprising an attachment feature for connecting the sensor device to the mounting bracket and a sensor situated over the sloping top surface of the elongated target, the sensor configured to:
            detect a position of the elongated target relative to the sensor, the position of the elongated target corresponding to a position of the steering column of the steering column assembly; and
            generate a signal that indicates the position of the steering column.

10. The steering column assembly of claim 9, further comprising a controller configured to:
    receive the signal that indicates the position of the steering column;
    generate a steering column position control value based on the signal; and selectively control the position of the steering wheel of the vehicle based on the steering column position control value.

11. The steering column assembly of claim 9, wherein the sensor includes a Hall-effect integrated circuit.

12. The steering column assembly of claim 11, wherein the sensor includes dual Hall-effect elements.

13. The steering column assembly of claim 9, wherein:
the attachment feature includes a first fastener located at an end of the elongated target and a second fastener located at an opposite end of the elongated target; and
the bottom surface is substantially level at the end of the elongated target and the opposite end of the elongated target.

14. The steering column assembly of claim 9, wherein the sensor device further includes a housing attached to the mounting bracket by the attachment feature of the sensor device, the housing defining a cavity, the cavity being sized to accommodate the sensor and arranged such that the sensor is suspended over the sloping top surface of the elongated target.

15. The steering column assembly of claim 9, wherein the second arcuate lateral surface is parallel to the first arcuate lateral surface.

16. A steering column assembly of a vehicle, comprising:
a steering column;
a mounting bracket operable to attach the steering column assembly to the vehicle;
a rake adjustment mechanism operable to move in an arcuate motion to adjust the steering column in a rake direction;
an absolute position sensor system comprising:
an elongated target comprising a sloping top surface, a bottom surface opposite to the top surface, a first arcuate lateral surface situated between and adjoining a portion of the top surface and a portion of the bottom surface, a second arcuate lateral surface situated between and adjoining another portion of the top surface and another portion of the bottom surface, the second arcuate lateral surface opposite to the first arcuate lateral surface, and an attachment feature for connecting the elongated target to the rake adjustment mechanism; and
a sensor device comprising an attachment feature for connecting the sensor device to the mounting bracket and a sensor situated over the sloping top surface of the elongated target, the sensor configured to:
detect a position of the elongated target relative to the sensor, the position of the elongated target corresponding to a position of the steering column of the steering column assembly; and
generate a signal that indicates the position of the steering column; and
a controller configured to:
receive the signal that indicates the position of the steering column;
generate a steering column position control value based on the signal; and
selectively control the position of the steering wheel of the vehicle based on the steering column position control value.

17. The steering column assembly of claim 16, wherein the sensor includes a Hall-effect integrated circuit.

18. The steering column assembly of claim 17, wherein the sensor includes dual Hall-effect elements.

19. The steering column assembly of claim 16, wherein:
the attachment feature includes a first fastener located at an end of the elongated target and a second fastener located at an opposite end of the elongated target; and
the bottom surface is substantially level at the end of the elongated target and the opposite end of the elongated target.

20. The steering column assembly of claim 16, wherein the sensor device further includes a housing attached to the mounting bracket by the attachment feature of the sensor device, the housing defining a cavity, the cavity being sized to accommodate the sensor and arranged such that the sensor is suspended over the sloping top surface of the elongated target.

* * * * *